United States Patent [19]
Patterson

[11] 3,753,586

[45] Aug. 21, 1973

[54] FLEXIBLE SYNTHETIC RESIN SEAL HAVING MANUALLY DEFORMABLE CLOSURE MEANS

[75] Inventor: Richard A. Patterson, St. Paul, Minn.

[73] Assignee: The United Seal Company, Columbus, Ohio

[22] Filed: Apr. 24, 1972

[21] Appl. No.: 247,005

[52] U.S. Cl............... 292/322, 24/16, 24/30.5, 292/307
[51] Int. Cl............................................ B65d 55/06
[58] Field of Search............... 24/16 PB, 30.5 P; 292/307, 322; 285/80

[56] References Cited
UNITED STATES PATENTS

| | | | |
|---|---|---|---|
| 1,237,034 | 8/1917 | Harris | 292/322 |
| 1,679,467 | 8/1928 | Dinsmoor | 292/307 R |
| 3,146,012 | 8/1964 | King, Sr. | 24/16 PB |

Primary Examiner—Francis K. Zugel
Assistant Examiner—Kenneth J. Dorner
Attorney—William S. Rambo

[57] ABSTRACT

A closed-loop security seal for detecting unauthorized opening of a closure of a freight car, meter casing, or the like, consisting of a one-piece body of molded synthetic resin composition which includes a flexible strap portion formed at one end with a barbed head and at its opposite end with a deformable socket member arranged to lockingly receive the head. The seal is locked against unauthorized opening by manually deforming the socket member around the barbed head.

1 Claim, 7 Drawing Figures

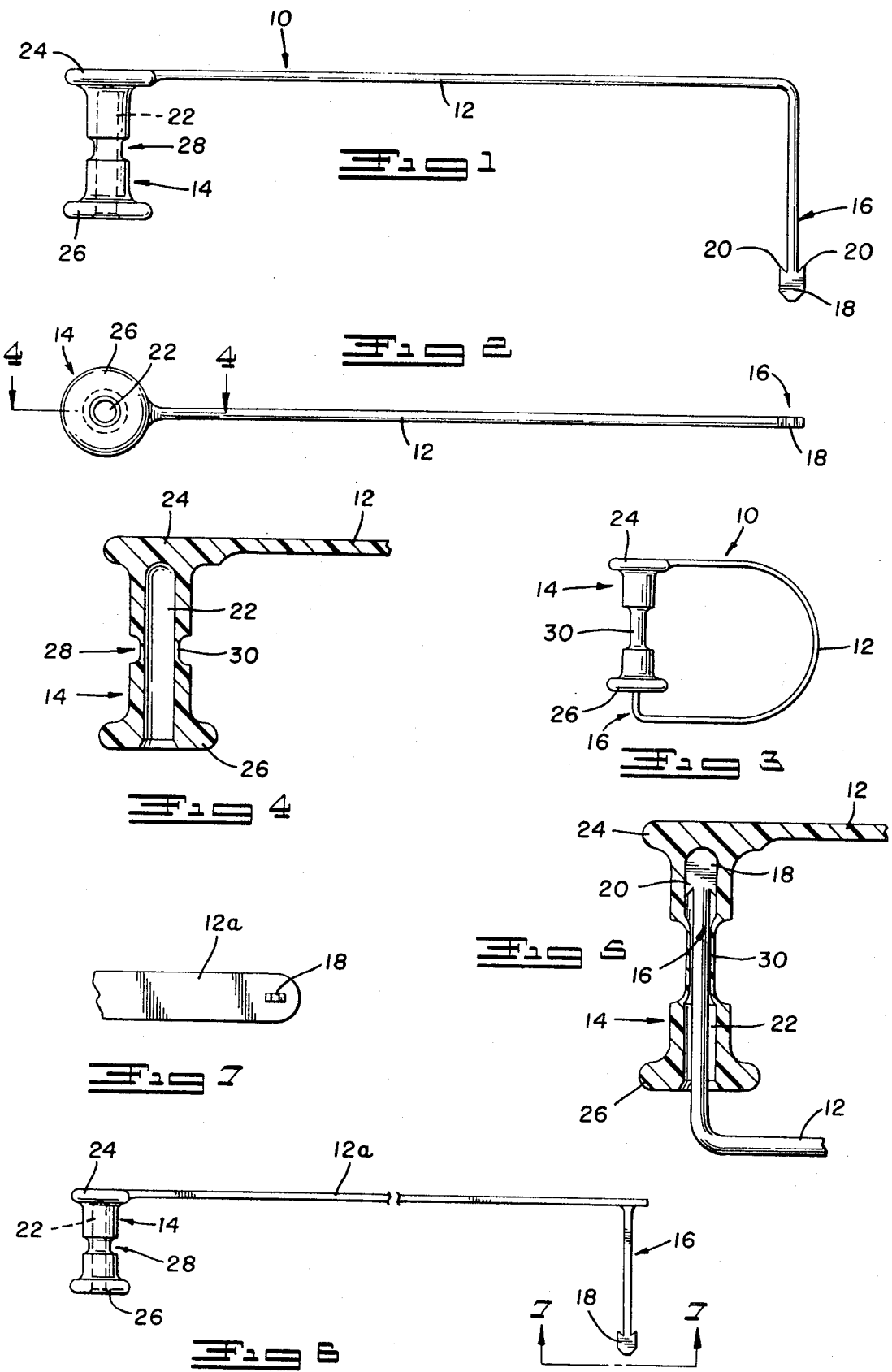

FLEXIBLE SYNTHETIC RESIN SEAL HAVING MANUALLY DEFORMABLE CLOSURE MEANS

BACKGROUND OF THE INVENTION

The present invention relates generally to security seals which are attached to the bails or eye members of a closure for indicating an unauthorized opening or tampering with the closure, access panel or door of a freight car, meter casing or similar enclosure. More particularly, the invention relates to an improved, one-piece, security seal composed entirely of a synthetic resin material.

Security seals in the past generally comprised a metal strap or wire adapted to be looped through the bails or eyes associated with a closure and then interlocked or connected at its ends by a deformable metal seal body. In certain instances the seal body was composed of a relatively soft metal, such as lead, which was deformed, swaged or molded about the ends of the strap or wire by means of a hand tool. Other seals comprised a socketed keeper into which the ends of the strap or wire were inserted and locked against separation. However, such prior art seals were relatively expensive and difficult to install.

SUMMARY AND OBJECTS OF THE INVENTION

This invention provides an improved, one-piece security seal formed entirely from a plastic or synthetic resin material and comprising an elongated flexible strap member formed at one end thereof with a barbed head and at the opposite end thereof with a cylindrical socket member arranged to receive said head, the socket member being formed with an intermediate, relatively thin wall region permitting axial elongation and radial contraction of the socket member to lock the barbed head of the strap member therein.

The principal object of the invention is to provide an inexpensive, molded plastic security seal which is easily installed and which is effective to indicate unauthorized opening or tampering with an associated closure.

Another object of the invention is to provide a seal which may be manually installed without the use of tools.

BRIEF DESCRIPTION OF THE DRAWINGS

FIG. 1 is a side elevational view of a security seal according to the present invention;

FIG. 2 is a bottom plan view of the seal illustrated in FIG. 1;

FIG. 3 is a side elevational view showing the seal in locked condition;

FIG. 4 is an enlarged, fragmentary vertical sectional view taken along the line 4—4 of FIG. 2 and illustrating the socket member of the seal;

FIG. 5 is a similar view, but showing the barbed head secured within the deformed socket member;

FIG. 6 is a side elevational view of a slightly modified form of seal according to the invention; and FIG. 7 is a fragmentary bottom plan view of the barbed head portion of the seal shown in FIG. 6 and looking from a plane indicated by the line 7—7 of FIG. 6.

DETAILED DESCRIPTION OF PREFERRED EMBODIMENTS:

With reference to the drawings, the seal of this invention comprises an elongated one-piece, molded plastic body 10 which includes an intermediate, relatively thin, flexible strap portion 12 formed at one end with a generally cylindrical socket member 14 and at the opposite end with a barbed head portion 16. The strap portion 12 and barbed head portion 16 are resiliently flexible and may be bent and looped through the aligned bails or eyes associated with the closure to be sealed.

As will be noted, the barbed head portion 16 of the seal terminates in a relatively enlarged, arrow head-shaped end extremity 18 having inwardly inclined barbs or shoulders 20.

The socket member 14, which is formed integrally with the strap portion 12, is of generally hour glass configuration and is formed with an outwardly opening, generally cylindrical walled socket 22 having a diameter which is normally slightly larger than the width of the barbed end extremity 18 of the head portion 16. The socket member 14 is formed adjacent the strap portion 12 with a relatively enlarged, circular boss 24 and at its outer end with a correspondingly enlarged, circular flange or knob 26. Intermediate the boss 24 and knob 26, the socket member is formed with a circumferential groove or recess 28 which provides a relatively thin, readily deformable wall section 30 intermediate the ends of the socket member 14.

The entire seal is preferably injection molded or otherwise formed from a synthetic resin, such as a polyamide (Nylon), polyethylene or polypropylene. These resins possess good tensile strength, and when subjected to tensile forces exceeding the elastic limits of the material, may be permanently stretched or axially elongated with proportionate reduction in cross-sectional diameter or width.

FIGS. 1 & 2 illustrate the seal prior to its application, while FIG. 3 illustrates the seal in its locked or "sealed" condition. Thus, when it is desired to apply the present seal, the barbed end portion 16 and intermediate strap portion 12 are passed through a pair of relatively aligned eyes or bails, not shown, of the closure member to be sealed. The enlarged head or end extremity 18 is then inserted fully into the socket 22 of the socket member 14 to a position beyond the thin wall region 30 of the socket member. The socket member is then subjected to manually applied tensile forces by pulling outwardly on the knob 26 while holding the opposite boss end 24 of the socket member stationary. This causes the relatively thin wall section 30 of the socket member to stretch and axially elongate and "neck-down" or contract radially behind the barbed head 18, as shown in FIGS. 3 and 5, thus locking or "sealing" the barbed end portion 18 of the seal within the elongated socket member 14. The inwardly inclined disposition of the shoulders or barbs 20 prevents withdrawal of the barbed end portion 18 from the socket member 14 without rupturing or otherwise breaking the walls of the socket member 14, a condition which may be readily detected by visual inspection.

FIGS. 6 and 7 illustrate a slightly modified form of seal in which the filamentary or cord-like flexible strap portion 12 of the seal body of FIGS. 1–5 is replaced by a relatively wider, flattened strap portion 12a of rectangular, rather than circular, cross-sectional configuration. In the modification shown in FIGS. 6 and 7, the barbed end portion 16 of the seal is also integrally molded with and forms an integral part of the flexible strap portion 12a, but is inset slightly from the end of the strap portion 12a. The relatively wider and flattened strap portion 12a provides sufficient area thereon for the imprinting or stamping of identifying indicia, code numerals, etc.

In view of the foregoing, it will be seen that the present invention provides an efficient, easily installed security seal which lends itself to mass production by standard plastics injection molding technics resulting in materially lowered unit production costs as compared with prior art metal security seals. The present seals are further characterized by their ease and simplicity of application independently of special sealing or crimping tools.

While presently preferred embodiments of the invention have been illustrated and described in detail, it will be understood that various modifications in details of construction and design are possible without departing from the spirit of the invention or the scope of the following claims.

What is claimed is:

1. A security seal for indicating the unauthorized opening of a closure, comprising an elongated, one-piece body of molded synthetic resin composition including an intermediate, flexible strap portion formed at one end thereof with a barbed head and at the opposite end thereof with a socket member arranged to telescope said head, said socket member being formed with an outwardly opening socket of a width to normally permit free and full insertion of said barbed head therein, and having an intermediate, thin walled section arranged to be permanently axially stretched and radially contracted in response to the application of manually applied tensile forces to said socket member whereby to lock said barbed head against undetected withdrawal from said socket member.

* * * * *